United States Patent [19]

Thompson

[11] Patent Number: 5,308,120
[45] Date of Patent: May 3, 1994

[54] PEEL OFF COUPON REDEMPTION CARD AND TRACKING SYSTEM

[75] Inventor: Kenneth Thompson, 2368 Eastman Ave., Ste. 3, Ventura, Calif. 93003

[73] Assignees: Kenneth Thompson; Debra Tak Thompson, both of Ventura, Calif.

[21] Appl. No.: 884,962

[22] Filed: May 15, 1992

Related U.S. Application Data

[63] Continuation-in-part of Ser. No. 881,542, May 12, 1992.

[51] Int. Cl.$^5$ .............................................. B42D 15/00
[52] U.S. Cl. ....................................... 283/70; 283/51
[58] Field of Search ................... 283/71, 81, 101, 105, 283/51, 56, 115

[56] References Cited

U.S. PATENT DOCUMENTS

| | | | |
|---|---|---|---|
| 832,796 | 10/1906 | Kimben | 283/51 |
| 985,108 | 2/1911 | Brophy | 283/51 |
| 2,205,956 | 6/1940 | Humphner | 283/71 |
| 2,314,387 | 3/1943 | Carlsson | 283/115 X |
| 4,641,578 | 2/1987 | Versaci | 283/51 X |
| 4,817,990 | 3/1989 | Krost | 283/101 |
| 4,830,405 | 5/1989 | Di Bella | 283/70 |
| 4,832,799 | 5/1989 | Knudsen et al. | 204/22 |
| 4,872,706 | 10/1989 | Brewen et al. | 283/71 |
| 4,874,129 | 10/1989 | Di Sapio et al. | 239/36 |
| 4,932,684 | 11/1990 | Vermeulen | 283/81 |

*Primary Examiner*—Mark Rosenbaum
*Assistant Examiner*—Willmom Fridie, Jr.
*Attorney, Agent, or Firm*—Jessup & Slehofer

[57] ABSTRACT

A coupon redemption card and tracking system includes a credit card size redemption coupon card used by the customer, and a tracking sheet used by the redemption center such as a restaurant. The redemption card has a plurality of mini coupons, which can be peeled off individually. Each redeemed coupon is affixed to the tracking sheet, which has dimensions of a dollar bill so that it can be placed in the till of a cash register. The tracking system facilitates the accounting and inventory of redeemed coupons. The coupon card is formed as two laminated layers of special paper joined together by a layer of adhesive material, and a layer of clear plastic film on the top face of the card. The base layer is fabricated from a special paper. An adhesive coating is applied to one side of the base layer. The peel off coupon layer is affixed to the adhesive coating. The finished layered sheet is printed on both sides, die-cut on the coupon side, and then laminated with the film on the other side. Each coupon that is removed from the card has adhesive to adhere the coupon to the tracking sheet. The small size of the mini coupons is convenient for the card holder and the redemption center. It eliminates the need to process diverse sizes and shapes of customer coupons. The system can be used wherever one has to keep track of various redeemable coupons and the like.

6 Claims, 5 Drawing Sheets

PEEL OFF COUPON REDEMPTION CARD AND TRACKING SYSTEM

CROSS REFERENCE TO RELATED APPLICATIONS

Continuation-in-part of Ser. No. 07/881,542, filed May 12, 1992.

BACKGROUND OF THE INVENTION

1. Field of the Invention

The present invention pertains to the following areas of technology:

PRINTED MATTER - a label;

PRINTED MATTER - having revealable concealed information, fraud preventer or detector, use preventer or detector, or identifier by removable material that is adhesively attached;

PRINTED MATTER - Advertising;

CHEMISTRY - adhesive coatings on sheets and products.

2. Description of the Prior Art

Cents-off coupons and other types of discount coupons are well know to grocery shoppers. Local newspapers print various grocery item coupons, which will be honored by most major supermarket chains. Coupons are also published in magazines, and are frequently mailed to households in mass mailings. The retail establishments that accept and honor these coupon then have to collate the coupons, and forward them to the manufacturer for reimbursement plus handling costs. Coupons come in various shapes, sizes and condition. The cashier accepts the coupons as they are presented to her at the check out line at a supermarket. The accepted coupons then have to be sorted and processed, which is very time consuming to the supermarket. It takes time for the cashier to read each coupon, credit the customer's cash register receipt for the amount stated on each coupon, and also ensure that the customer has purchased the product stated on the coupon. The cashier then places the redeemed coupons in a special drawer for sorting later.

Redemption stamps and stamp booklets also are well known in the art. Green Stamps were popular in the 1950's. Participating retail stores would display a decal or sign indicating that they would issue Green Stamps. Whenever a customer purchased goods at the store, the store would issue to the customer a quantity of Green Stamps, which would usually be based upon the purchase price of the goods. The Green Stamps were similar to postage stamps and had a glued backing that only had to be moistened to activate the adhesive ability of the stamps. The customer was supplied with Green Stamp redemption booklets, which contained a fixed number of blank pages for gluing the Green Stamps thereto. The object was to fill up several booklets with Green Stamps. The full booklets then could be redeemed at a Green Stamp redemption center. The redemption center would give the redeemer free goods in exchange for a certain number of booklets filled with Green Stamps. The system was funded by the retail stores, which purchased the Green Stamps from the redemption center. The participating stores believed that issuing Green Stamps increased their business, because customers would prefer to shop at a store that issued Green Stamps over a store that did not.

SUMMARY AND OPERATION OF THE INVENTION

A coupon redemption card and tracking system includes a credit card size redemption coupon card used by the customer, and a tracking sheet used by the redemption center such as a restaurant. The redemption card has a plurality of mini coupons, which can be peeled off individually. Each redeemed peel off coupon is affixed to the tracking sheet, which has dimensions of a dollar bill so that the sheet can be placed conveniently in the till of a cash register. The tracking system facilitates the accounting and inventory of redeemed coupons.

The coupon card is fabricated from two laminated layers of paper or paper-like material, a clear plastic protective film, and an adhesive coating. The base layer is fabricated from a special paper. An adhesive layer is applied to one side of the base layer. The layer, which will form the peel off coupon layer, is then affixed to the layer of adhesive material. The finished two layered sheet is held together by adhesive material. The layered sheet is produced as a large single sheet or as roll of the material. The sheet or roll is then sent to the printer. The printer applies printer's ink to both sides of the sheet to form the desired printed matter on both sides of the sheet. After the printer's ink transfer process has been completed, the top side of the sheet has the requested identification or advertising matter printed on it. The bottom side has the requested individual coupons printed on it. The next step is to have the top surface laminated with a clear plastic film for durability, protection, and to provide a pleasing appearance. This clear protective film lamination process can take place immediately after the inking process. It must be done afterwards to protect the previously applied printer's ink. The laminated sheets are then die-cut on the coupon side. When the individual coupon is removed from the card, it has sufficient adhesive so that it will adhere to the tracking sheet. The small size of the mini coupons is convenient for the card holder and it is also convenient for the redemption center. It eliminates the need to process diverse sizes and shapes of customer coupons. The system can be used wherever one has to keep track of various redeemable coupons and the like.

The present invention is preferably used for fund raising by charitable organizations that have youngsters as members. Such organizations include the Little League, Boy Scouts, Girl Scouts, and the Y.M.C.A. Initially various fast food restaurants are contacted in a given geographic area to ask if they would participate in the fund raising drive. The fast food restaurants are asked to redeem the coupons submitted by the customer. The fast food restaurant absorbs the costs. The fast food restaurant benefits by attracting new customers, keeping customer loyalty, and increasing its good will in the community. The coupon cards are fabricated and sold to the charitable organization for a fee. The charitable organization then sells the cards to the public for a higher fee. The difference between the cost and the price sold to the public is the profit made by the organization. The money goes to fund the charitable or non-profit organization. There is no overhead involved, because the cards are sold by the members. The coupon card usually has a legend printed on it to let the customer know which restaurants will honor the coupons. The coupon system also eliminates employee theft at the restaurant. It prevents a sales clerk from selling an item of food, pocketing the money, and then telling the manager that he or she gave away the item of food. Any food items given away would have to be evidenced by the redeemed coupon affixed to the tracking sheet in the clerk's till. When the coupon is redeemed, the clerk affixes the coupon to a blank square on the tracking sheet and then writes in the amount that would normally be charged for that food item as if the customer had paid for the item of food. The tracking sheets are also acceptable evidence by the Internal Revenue Service to show a legitimate tax deduction by the restaurant. There are three parties involved in the promotion: the fast food restaurant, the coupon card distributor, and the non-profit organization. This three party arrangement is required by the I.R.S. before the restaurant can take the full deduction as a legitimate business expense. The completed tracking sheets already have the prices written in by the clerks. All of the prices on the tracking sheets are tallied by the accountant. The total amount is allowed by the I.R.S. as a deduction. Other types of promotional arrangements result in only a partial deduction by the I.R.S. of the actual costs incurred by the fast food restaurant. It is also useful when the franchisee calculates the royalties due to the franchisor, which are usually based on gross sales.

The thickness of the coupon card is 0.0177 to 0.019 inches. Conventional plastic credit cards are 0.021 to 0.027 inches in thickness. This is a standard thickness so that the plastic credit cards can be used in a machine that accepts plastic credit cards. All machines are designed to accept only this range of thicknesses for a plastic credit card. The present invention cannot be used in a credit card machine, because it is too thin. This prevents misuse of the coupon card by those who might try to use the card at a bank teller machine for example.

DETAILED DESCRIPTION OF THE PREFERRED EMBODIMENT

Figure 1:
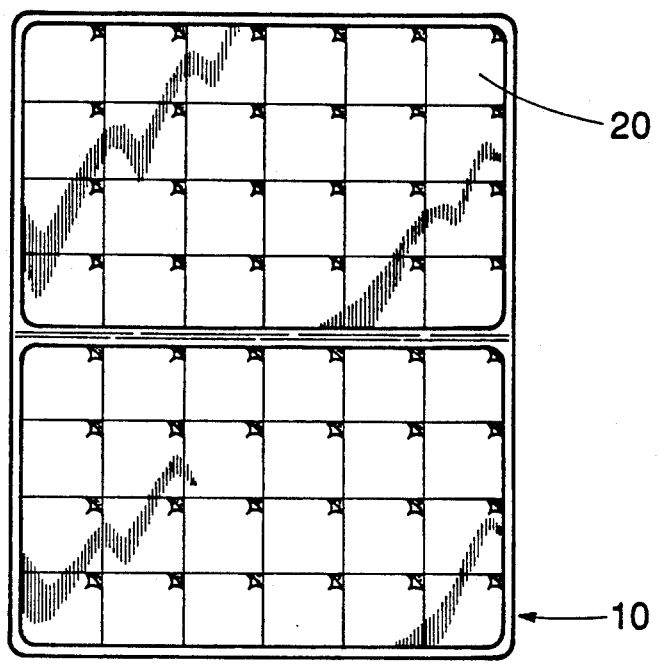
FIG. 1 is a top plan view of a pair of folded peel-off redemption coupon cards, which are illustrated in the unfolded position.
Figure 2:
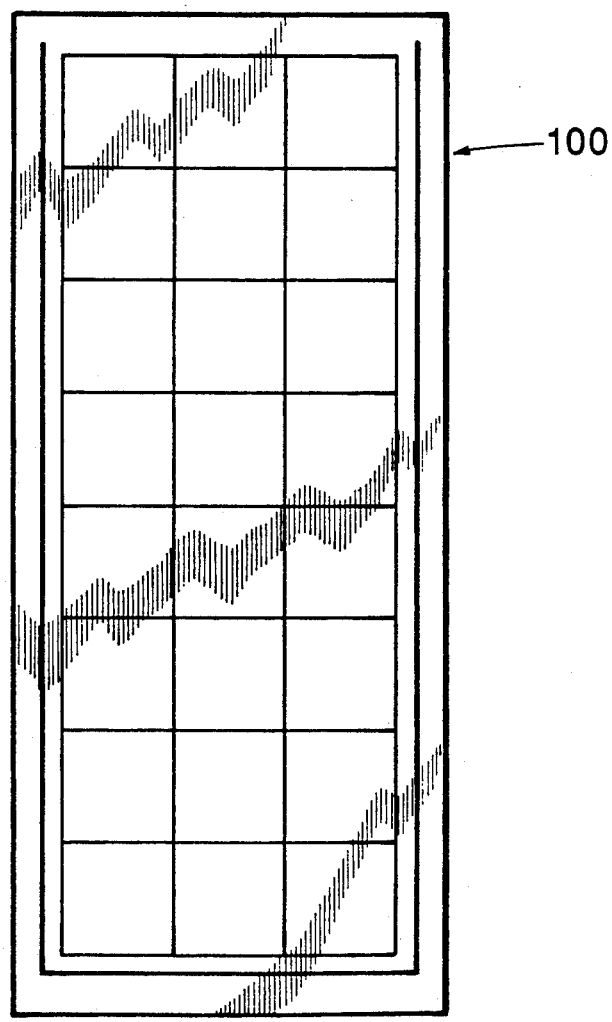
FIG. 2 is the tracking sheet where each redeemed peel-off coupon from the card can be affixed thereto.
Figure 3:
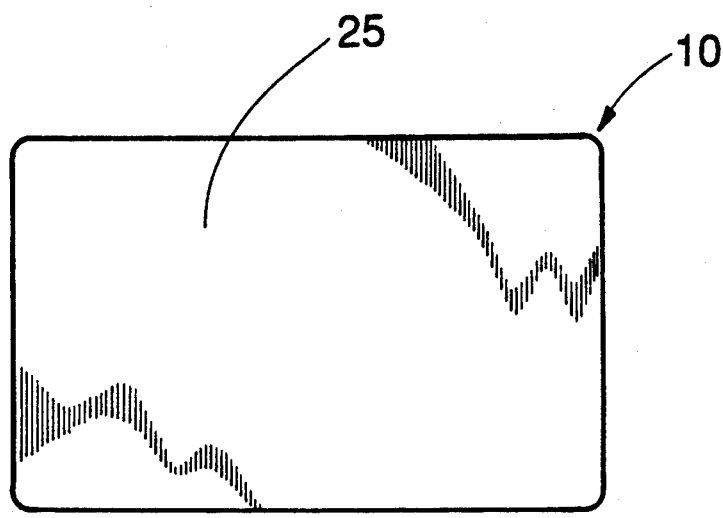
FIG. 3 is a bottom plan view of a credit card size peel-off coupon card.
Figure 4:
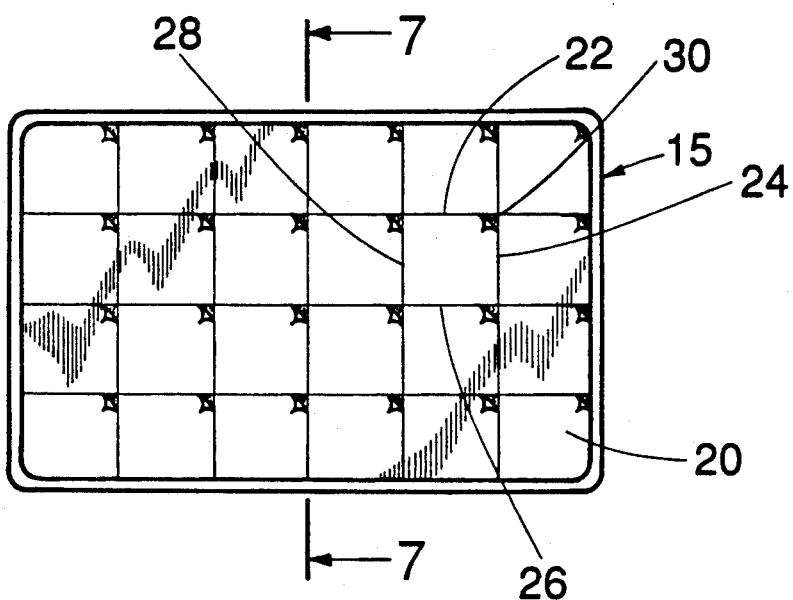
FIG. 4 is top plan view of FIG. 3.
Figure 5:
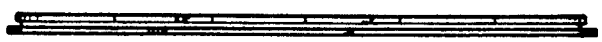
FIG. 5 is a front elevational view of FIG. 3, the back being identical.
Figure 6:
FIG. 6 is a left side elevational view of FIG. 3, the right side being identical.
Figure 7:
FIG. 7 is a sectional view taken along the line 7—7 in FIG. 4.
Figure 9:
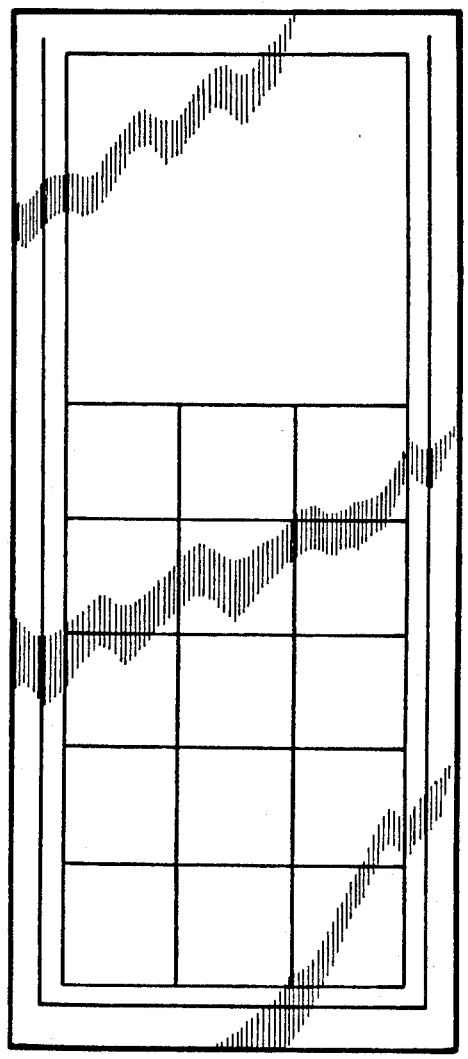
FIG. 9 is a top plan view of the alternate embodiment of the coupon card shown in FIG. 2.
Figure 10:
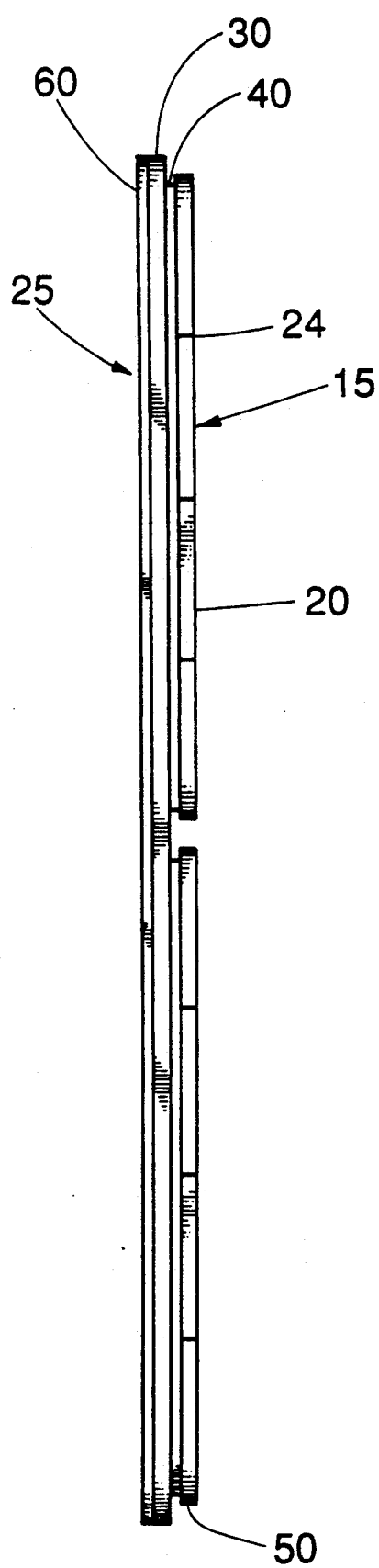
FIG. 10 is an enlarged left side elevational view of the coupon card shown in FIG. 8. clearly showing the layers of material forming the folded pair of coupon redemption cards.

Referring now to the drawings, the present invention includes two major components. The first component is referred to as the peel off coupon redemption card 10. The single card is illustrated in FIGS. 3–7 and 11–12. The second component is referred to as the tracking sheet 100. The tracking sheet is illustrated in FIGS. 2, 9 and 13. The tracking sheet illustrated in FIG. 13 is 6"×2 ½". The single coupon redemption card 10 is a credit card size, which can easily fit into the card holder of a user's wallet. The card 10 is thin, flat and has dimensions of 3⅜"×2⅛". The four corners of the card are rounded. The coupon card is thinner than a plastic credit card. The coupon card is 0.0175 to 0.019 inches in thickness. Other than the thickness, it is identical in size to a typical plastic credit card such as a bank card or an oil company credit card. The back face 15 of the card 10 contains a plurality of small mini coupons. FIGS. 4 and 12 illustrate the back side of the card with the peel off mini coupons. Preferably the redemption card has sixteen mini peel off coupons 20 secured to it. Each coupon is scored at any adjoining edges 22, 24, 26 and 28 by a die-cut process so that one can peel away a corner of the coupon with one's finger nail and then can easily remove that particular coupon. A "dog ear" marking 30 is illustrated at one corner of each coupon to visually indicate to the user where to begin the peeling process. The mini coupons do not have the "dog ear" 30 portion already exposed. It is foreseeable that a pull tab or string of some type could be integrated with the coupon to assist in the coupon removal process. The underside of the coupon 20 has an adhesive backing to hold the coupon in place. Each coupon on the coupon card has printed matter printed thereon when the coupon card is fabricated. In the preferred embodiment, the printed matter on each coupon card is for a cash price discount or a buy one-get one free meal at a fast food type of restaurant. This type of coupon card is illustrated in FIG. 12. FIG. 12 illustrates coupons for several different fast food restaurants to allow the card holders flexibility in their selections on where and what kinds of food to eat, because the participating restaurants printed on the coupons will honor the card. The card holders tell the cashier at the restaurant when ordering that they want to redeem one of more of their coupons. The card holder then hands the cashier the coupon card. The cashier peels off the requisite coupon for that particular establishment. The cashier has a second component, the tracking sheet 100, located in her cashier drawer. The tracking sheet is about the size of a dollar bill. This allows the tracking sheet 100 to fit in one of the compartments in the cashier's tray normally used for holding paper currency. After the cashier has peeled off the mini coupon from the discount card, she affixes it to the tracking sheet kept in the cash register tray. The peeled off coupon 20 has sufficient adhesive backing remaining on it so that it will permanently affix itself to the tracking sheet 10. This sequence of transferring the coupon from the card to the sheet is illustrated in FIGS. 12 and 13. The tracking sheet has room at the top of it for printing with adjacent blank lines to enter information such as date, register number, location, shift number and the like. The tracking sheet also has a grid layout defining a plurality of squares, which are slightly larger than the mini coupons. The squares are sufficiently large to accommodate the coupons to be affixed to the tracking sheet without having to be placed too closely to one another. After the cashier has affixed the coupon to the tracking sheet, the cents off coupon or the free item coupon as the case may be, is deducted from the customer's itemized bill in the usual manner. The cashier then returns the redemption card to the customer. At the end of the shift or at any reasonable interval, the manager can remove the cash drawer tray along with the cash received, and the tracking sheet with the affixed coupons. The tracking sheet with the affixed coupons function as a convenient reference list to assist in counting the cash and coupons in the cash drawer tray in order to tally and balance out the total transactions for the shift with the amount of money and coupons taken in.

The redemption card 10 is fabricated from four flat sheets of superposed layered material. The card 10 has a front face 25 and a back face 15. The front face 25 is used for printing identification, graphics, or advertising on it, which is readily visible on the card. The back face shows the peel off mini coupons 20. The front face 25 of the coupon card comprises the front side of a sheet 30 of paper and is described as a tag 12 point release liner. The sheet 30 is described as the base layer. The back side 35 of the sheet 30 has a layer of adhesive 40 applied to it. The adhesive 40 is sold by FASSON label, which it calls SP11G special liner. The adhesive has a rubberlike base material. It is very tacky to allow the coupon to adhere to many types of material. The adhesive will not "bleed" or melt when it becomes worn. This is necessary, because the coupon card will be carried in a man's wallet. The man can sit on his wallet containing the coupon card, and yet the adhesive will remain stable. The next sheet is used for the coupons. This sheet 50 is described as the coupon layer. This sheet is sold by FASSON label manufacturing company. It is described as number 60 blue/white high gloss white cream coat. FASSON sells its sheets under the federally registered trademark CRACK'N PEEL Plus. This material is sold as 11.5"×15" sheets or approximately 1,000 feet long rolls. The top face of the liner which contains the advertising usually has a plastic film to cover the advertising to give a more durable and shiny surface to the card. This top film is known as face stock and it is made out of 0069-2Mil UCL Polyolam NPL Film. The card normally requires five different operations just to make the card material. There are two material companies and a laminating company to create the material company to create the material in sheet or roll form. The printer then prints the advertising on the face of the sheet in sections so that the cards can be cut separately and then on the bottom face of the material the appropriate coupons are printed on the card in the appropriate spaces. After the printing has taken place, then the top face of the tag liner is covered with the durable plastic liner and also the coupons are die-cut during the printing process. Therefore, the printing process comprises printing the top and the bottom of the card, putting a plastic laminate on one side of the card and die-cutting the other side of the card. The die-cutting process is sufficiently deep so that the coupons can be peeled off.

Figure 11:
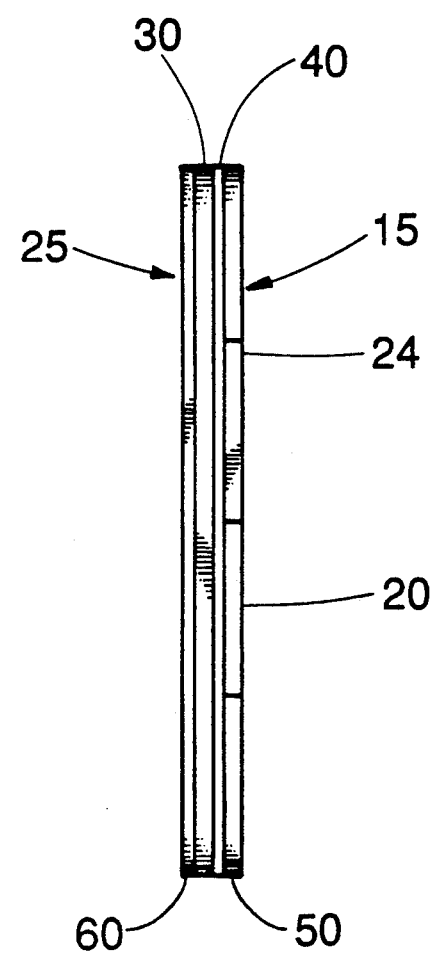
FIG. 11 is an enlarged view of FIG. 6 clearly showing the layers of the materials forming the coupon redemption card.
Figures 12, 13:
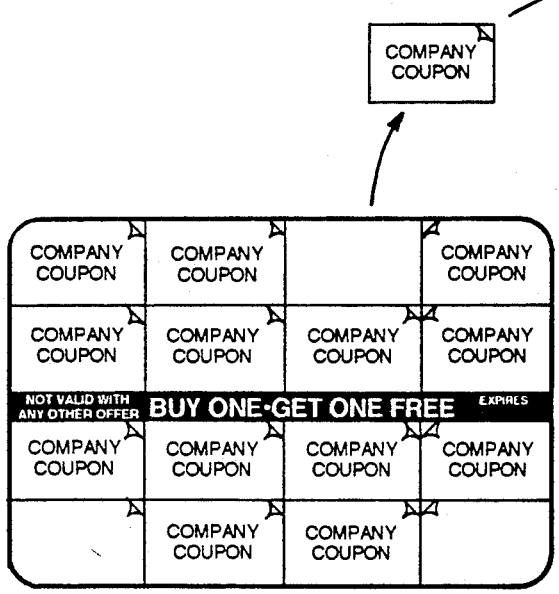
FIG. 12 illustrates the back face of a single redemption card having sixteen mini coupons with various fast food restaurants printed thereon.
FIG. 13 illustrates a typical tracking sheet used by a redemption center such as a fast food restaurant.

FIG. 11 illustrates the side view of the coupon card. FIG. 12 illustrates the side view of a double coupon card. The thickness of the layers are exaggerated to clearly illustrate the layering of the card.

Figure 8:
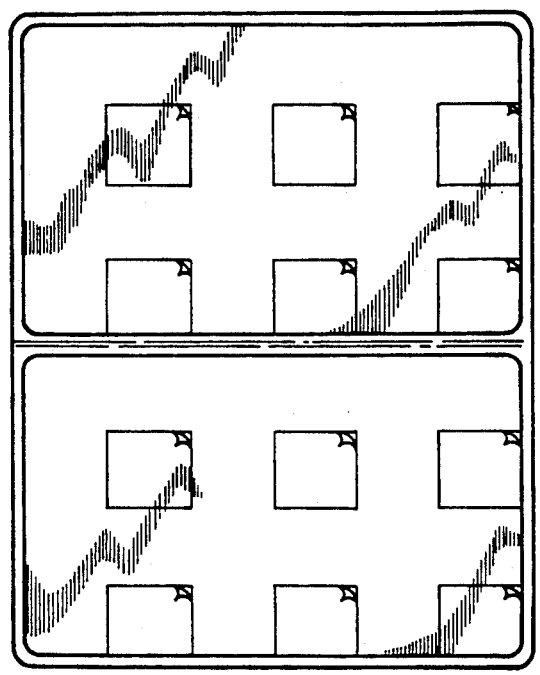
FIG. 8 is a top plan view of a alternate embodiment of the coupon card shown in FIG. 1.

FIG. 8 illustrates a double card where the coupons are spaced apart. FIG. 9 illustrates one type of tracking sheet.

It is to be understood that the specific materials used to form the card can be substituted for those herein described. The coupon card material is similar to a peel off label sold at office supply stores. The coupon card is an enlarged label and improved to form the coupon card. The coupon sheet and the base sheet could be fabricated from any number of materials. The adhesive film could be any number of films already on the market. The plastic film could also be any number of films already available on the market.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A method of redeeming a coupon secured to a redemption card and tracking the redeemed coupon, which comprises:

presenting to a redemption center other than a bank a redemption card containing at least one non-negotiable peel-off coupon;

placing a tracking sheet at said redemption center;

peeling off at least one said peel-off coupon that is die cut from said redemption card;

transferring said peeled-off coupon to said tracking sheet;

crediting the value of said coupon to the redeemer; and returning said redemption card to the redeemer.

2. A laminated coupon redemption card, which comprises:

a base layer having a front face and a back face;

a thin adhesive layer applied to said back face of said base layer;

a coupon layer having a coupon face and an adhesive face;

said adhesive face of said coupon layer being applied to said adhesive layer and having the same overall dimensions as said base layer;

said coupon face of said coupon layer having coupons printed on it and scored at regular intervals to form a matrix of small adhesive backed removable coupons.

3. The coupon card as recited in claim 2 wherein said coupon card has the overall dimensions of a credit card.

4. The coupon card as recited in claim 2 further comprising:

said front face of said base layer having printed matter thereon; and a protective clear film laminated over said front face of said base layer.

5. The coupon card as recited in claim 4 wherein:

said base layer is fabricated from a 0.012 inches thick sheet of paper;

said coupon layer is fabricated from a 0.012–0.05 inches thick sheet of paper;

said adhesive layer is SP-111G grade adhesive sold by Fasson label supply company; and said protective film is comprised of #69 UCL polyolam film having a thickness from 0.00069 to 0.02 inches.

6. The coupon card as recited in claim 2 further comprising:

tracking sheet means comprising a flat rectangular sheet having overall dimensions sufficiently small to fit into a compartment of a typical tray in a cash register;

said tracking sheet having a plurality of rectangles, each being slightly larger than each said peel-off coupon of said coupon card for affixing said redeemed coupons from said coupon card and keeping a record of said redeemed coupons on said tracking sheet.

* * * * *